Aug. 2, 1949.  A. S. FITZ GERALD  2,477,728
AUTOMATIC TEMPERATURE CONTROL SYSTEM

Filed Dec. 12, 1946  3 Sheets-Sheet 2

INVENTOR
ALAN S. FITZ GERALD
BY
ATTORNEYS

Patented Aug. 2, 1949

2,477,728

UNITED STATES PATENT OFFICE 2,477,728

AUTOMATIC TEMPERATURE CONTROL SYSTEM

Alan S. Fitz Gerald, Wynnewood, Pa., assignor to Warren Webster & Company, Camden, N. J., a corporation of New Jersey Application December 12, 1946, Serial No. 715,856

9 Claims. (Cl. 236—46)

This invention relates to electrical control systems and more particularly to intermittent systems in which a process or service is interrupted at regular intervals, the mean rate of performance of said process being adjusted by varying the relative periods at which the process is respectively, activated and interrupted.

My invention is particularly applicable to heating systems and especially to major heating systems employed in large buildings wherein extensive radiation is installed.

My invention may with advantage be carried out with magnetic amplifier arrangements of the type I have described in my co-pending application, Serial No. 719,445, filed December 31, 1946.

It is an object of my invention to provide improved means and methods for varying the "on" and "off" ratio in accordance with an electrical quantity in relation to which it is desired the process be performed.

It is another object of my invention to provide a heat control system of the intermittent type in which the "on" and "off" ratio is automatically varied in accordance with the outdoor temperature.

It is a further object of my invention to provide a heating control system of the intermittent type with automatically variable "on" and "off" ratio, having a minimum "on" period under all circumstances.

It is yet another object of my invention to accomplish the above result with apparatus of an exceptionally reliable type, combining a high order of sensitivity with freedom from delicate contacts, moving parts, or apparatus requiring maintenance, attention, or renewal.

These and other novel features which I believe to be characteristic of my invention will be set forth with particularity in the appended claims. My invention itself, however, both as to its organization and methods of operation, together with further objects and advantages thereof, may best be understood with reference to the following description taken in connection with the accompanying drawings, in which:

Fig. 6 is a chart showing the heat controlling action of my invention.

Figure 1:
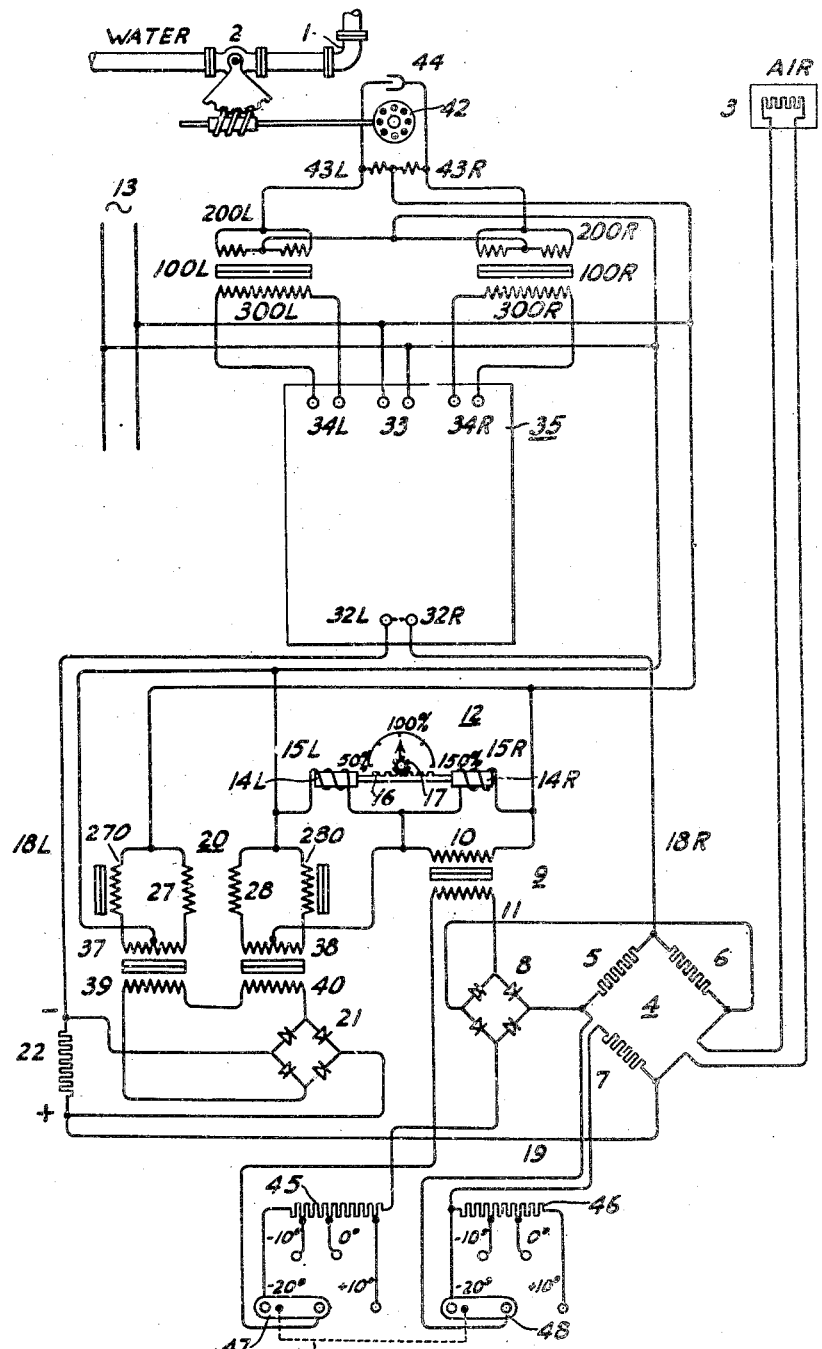
Fig. 1 is an electrical circuit diagram representing an embodiment of my invention applied to a vapor or fluid heating system.

Referring to the drawings, I show in Fig. 1 a portion of a fluid or vapor heating system 1 including a control valve 2. The valve 2 is actuated through a temperature responsive control system comprising a thermal resistance element 3 mounted at a suitable location out-of-doors so as to be responsive to ambient external temperature.

According to my invention the heating medium is at all times maintained at a mean temperature which is in direct relation with the ambient temperature.

My control system comprises a bridge circuit 4 including the thermal element 3 and three other resistors of fixed value, 5, 6, and 7. The bridge 4 is energized from an A. C. source 13, through a rectifier 8, and an isolating transformer 9 having a primary winding 10 and a secondary winding 11.

I also connect across the source 13 a control device 12 for manually varying the operation of my invention. The control device 12 comprises a variable inductance structure consisting of two solenoids having conjoined plungers 14L, 14R entering into coils 15L, 15R together with manually operable means such as a rack 16 and pinion 17.

I show also in Fig. 1 a cycling device 20 connected to energize a rectifier 21 so as to supply a fluctuating unidirectional current to a resistor 22.

As shown in Fig. 1, the bridge 4 is energized with unidirectional current across its horizontal diagonal. The bridge 4, through its vertical diagonal, is connected, by means of conductors 18L, 18R and 19, in series with the resistor 22.

Figure 2:
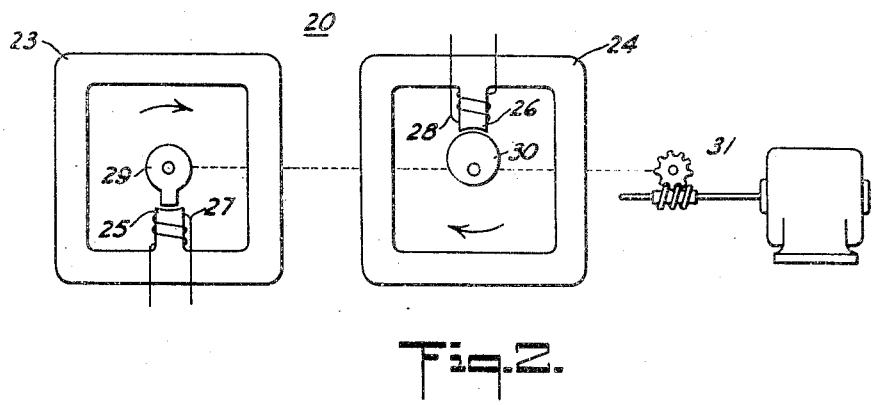
Fig. 2 is a view showing details pertaining to the embodiment shown in Fig. 1.

The cycling device 20, as shown in greater detail in Fig. 2 consists of a pair of variable inductance devices comprising two field systems 23 and 24 having each single salient poles 25 and 26 provided with windings 27 and 28 respectively. The two field systems may conveniently be coaxially mounted, which may be done with greater compactness if the poles 25 and 26, and coils, 27, 28 be diametrically displaced as shown in Fig. 2. Rotating within the field systems 23 and 24, I provide two inductors of special profile 29 and 30. The inductors 29 and 30, which may be mounted upon a common shaft, as indicated by the broken line Fig. 2, are caused to rotate at a slow, constant, speed by means of any convenient form of slow motion drive indicated at 31.

Conductors 18L, 18R are connected to a magnetic amplifier 35 for controlling the valve 2 by means of an arrangement which may be substantially similar to that which I have described in Fig. 8 of my co-pending application, Serial No. 719,445, filed December 31, 1946, to which reference may be had for further detailed description.

In brief the magnetic amplifier 35 has two binding posts 32L, 32R for receiving an input of reversible direct current polarity. The magnetic amplifier 35 also has two pairs of output terminals 34L, 34R for supplying amplified direct current to saturable core devices having cores 100L, 100R, A. C. windings 200L, 200R and D. C. saturating windings 300L, 300R to which terminals 34L, 34R are connected.

The valve 2 is actuated by a motor which may be of the induction type having a rotor 42, windings 43R and a capacitor 44 energized from the A. C. source 13 all as described in my co-pending application Serial No. 719,445 filed December 31, 1946. As therein explained when D. C. input is applied to 35 of polarity such that 32R is positive and 32L is negative current is delivered by 34R to the saturating winding 300R, but no appreciable current is delivered by 34L to 300L under which condition the motor turns in one direction. In Fig. 1, under this condition the motor should operate in the direction which increases the amount of heat delivered.

Conversely, if 32L is positive with regard to 32R, the motor will operate in the reverse direction, that is to say less heat will be furnished to the heating system.

Referring to the cycling device 20, the two inductance windings 27 and 28 together with two counterpoise inductances of fixed value 270, 280 and two transformers having mid-tapped primary windings 37, 38 and secondaries 39, 40, are connected together to form two balance circuits.

The value of the counter-poise inductance 270 is so apportioned that when the inductor 29 is in such an angular position that the air gap between 25 and 29 is a maximum, the currents in the two halves of the primary winding 37, are substantially equal and in opposition. As a result there is no transformer action and no A. C. voltage is set up in the secondary winding 39.

In like manner the inductance value of the counter-poise 280 is made so that with the maximum air gap between 26 and 30, no voltage is induced in 40.

As shown in the diagram the differential circuit including 27 and 270 is energized between the mid-tap on 37 and the junction of 27 and 270, from the A. C. source 13.

The other balance circuit is energized through the control device 12. As shown in Fig. 1 the balance circuit including 28 and the counterpoise 280, is connected in series with the primary winding 10 of the transformer 9 across the source 13, the junction between the mid-tap of the winding 38 and the transformer primary winding 10 being connected to the junction between 15L and 15R.

It will be apparent to those skilled in the art that when the two plungers 14L, 14R are in mid-position, that is to say, equally entrant into the windings 15L, 15R the voltage across 15L, 15R will be equal as will also be the voltages across the circuit which includes 28, 280 and the primary winding 10. It will be evident that if the plungers 14L, 14R are moved towards the right so that 14R enters further in the coil 15R and the plunger 14L is retracted from the coil 15L the impedance of 15R will increase and that of 15L will decrease. Accordingly the voltage across 10 will increase and that across the balance circuit which included 28 and 280, will be reduced.

In like manner by moving the plungers 14R in the opposite direction the energization of the bridge 4 is decreased and that of the balance circuit which includes 28 and 280 will be increased.

Figure 3:
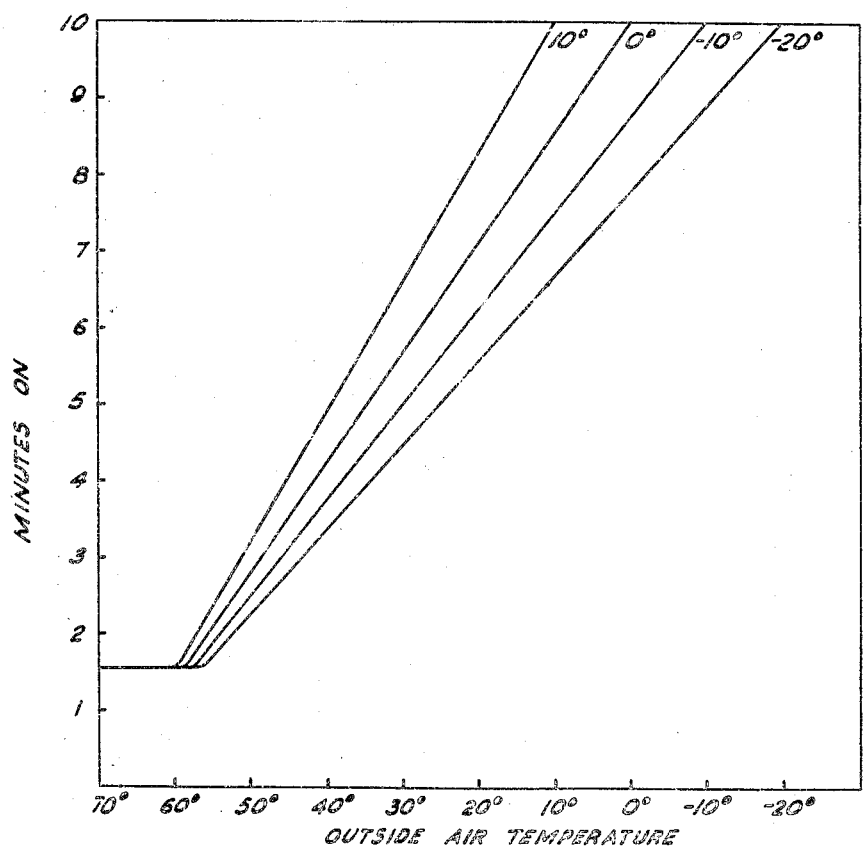
Figs. 3, 4 and 5 are curves to illustrate the operation of my invention.
Figure 3:
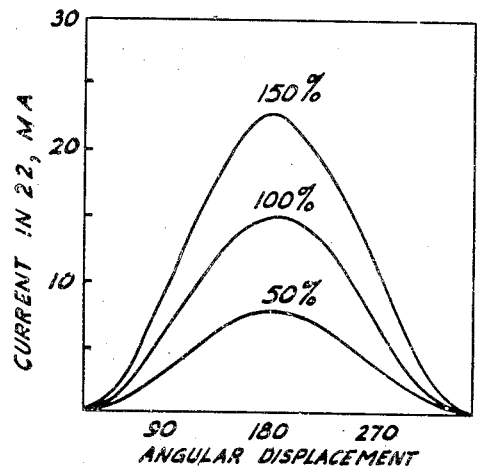
Figure 4:
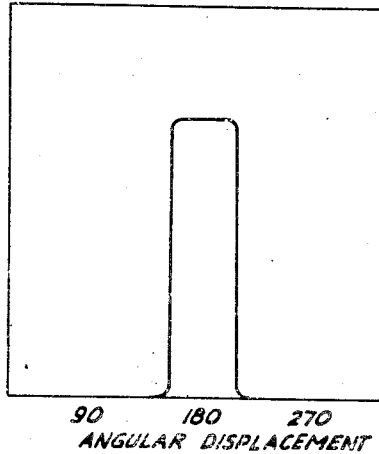
Figure 5:
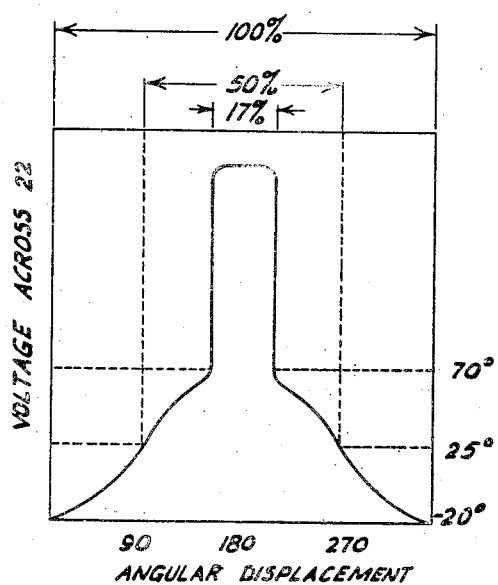

The operation of the cycling device 20 is graphically illustrated in Figs. 3, 4 and 5, which show the relation between the current flowing in the resistor 22 and the voltage drop across 22 and the angular displacement of the inductors 29 and 30. Fig. 3 shows the component due to the balance circuit which includes 29. Fig. 4 shows the component due to the balance circuit which includes 27 and Fig. 5 shows the resultant of these two components.

In Fig. 3, I show three curves marked respectively 50%, 100%, and 150%. These designations refer to the position of the control device 12. Thus, if normal controlling action is desired the control device 12 is set in mid-position under which condition the current in the resistor 22 will be in accordance with the middle curve in Fig. 3. That is to say, the curve identified by the legend 100% in reference to the fact that 100% of normal heating action is desired.

If plungers 14L, 14R are moved to the left so as to increase the energization of 28 and 280, the current in resistor 22 will be increased. I show in Fig. 3 at the upper curve identified by the legend 150 which results when control device 12 is adjusted to give 150 per cent normal heating action.

Conversely if the device 12 be moved in the opposite direction the effect is to deliver less than the normal amount of heat for any given air temperature. Accordingly I have shown in Fig. 3 a third curve marked 50 per cent which shows the control characteristic when the device 12 is so positioned.

To produce curves of the general form shown in Fig. 3 the profile of the inductor 30, is based upon a circle rotating on an eccentric axis, modified by such factors as the width and shape of the pole piece 26, magnetic leakage and fringing effects, and any non-linear effect which may inhere in the rectifier 21.

Referring now to the action of 27 and 270 it will be noted that the inductor 29 is quite differently shaped to 30 in that it has a narrow saliency extending only over a few degrees of arc. Thus the inductance of the coil 27 remains constant over a wide range of angular displacement of 29 and increases to a higher value only during that relatively restricted range of angular displacement in which the saliency of the inductor 29 is in proximity to the pole 27.

Accordingly the relation between the current flowing in the resistor 22 and the displacement of the rotor 29 is as shown in Fig. 4.

It will be noted that the balance circuit which includes 27 is energized directly across the source 13. Accordingly the operation of the control device 12 has no effect upon the component of current flowing in 22 due to the action of the system comprising 27 and 270.

The combined effect of the two inductance balance systems acting together is shown in Fig. 5, which shows the relation between the angular displacement of the complete rotor system of 20 and the voltage drop set up across the resistor 22. It will be seen that over approximately 17 per cent of the cycle of rotation the voltage rises to a relatively high value.

During the remainder of the cycle the current in the resistor 22 increases from zero up to a maximum value, which maximum value is determined by the position of the control device 12. The relation between the angular rotation of the inductor system and the current in 22, during that portion of the cycle of rotation in which inductor 29 is inactive, follows approximately a sine law the zero axis of the sine wave corresponding with 90° and 270° of rotation.

In order to explain the operation of my invention as clearly as possible and to avoid confusion I have shown in Fig. 5 only the curve which obtains with the device 12 set for 100 per cent. It is to be understood that the amplitude of the component of the curve in Fig. 5 which derives from the inductor 30, that is to say, the sinusoidal portion thereof may be adjusted, in accordance with the position of 12, to any desired value between a voltage corresponding to the upper curve of current in Fig. 3, which is marked 150% and the lower curve marked 50%.

I show in Fig. 1 two tapped resistors 45, 46. These resistors are for the purpose of adjusting the control action of my invention so as to give a plurality of different operating characteristics at will. As shown in the diagram the resistor 46 is connected in the conjugate arm of bridge 4 in series with resistor 7. Means are provided for selecting a plurality of different values of the resistor 46 as for example, by means of a movable link 48 which may be placed in one of several positions. For example, I have shown in Fig. 1 an arrangement for selecting any one of four different resistance values.

I show also in Fig. 1 a resistor 45 also adjustable to any one of four different resistance values by means of a similar link 47. As will be explained in greater detail hereinafter the adjustment of 45 is to be coordinated with that of 46. I prefer that this should be accomplished by some form of insulating mechanical arrangement connecting 47 with 48 such as I have indicated schematically by the broken line at 49. The several positions of the links 47 and 48 are indicated on the drawings by the numerals −20°, −10°, 0°, +10° which have reference to the performance characteristic desired as will hereinafter be explained in greater detail. For the purpose of the following explanation it will be assumed that as depicted in Fig. 1, the control device 12 is set at 100 per cent and the links 47 and 48 are set at the position marked −20°.

Referring now to the bridge 4 as hereinbefore described the vertical diagonals of the bridge are connected in series with resistor 22 to the input terminals 32L, 32R of the magnetic amplifier 35.

It will further be assumed, for the purpose of explanation only, that the thermal element 3 has a positive temperature coefficient. A material having a negative temperature coefficient can equally be used in practicing my invention, but if such a material be employed the explanation of the system would be modified.

With the link 48 in the position shown in the figure no additional resistance is added in series with 7. If resistors 5 and 6 are considered to be bridge ratio arms of equal value, the value of the resistance 7 is made equal to the resistance of the thermal element 3 at −20° F. Thus the bridge is in balance at −20° F., and no difference of potential is set up across the vertical diagonal, that is to say, between conductors 18R and 19. If the temperature rises above −20° the bridge will become unbalanced; and since the bridge is energized across its horizontal diagonal as shown in the diagram so that the junction between 6 and 3 is negative, when this occurs the direction of the unbalance will be such as to cause 18R to become negative with reference to 19. Thus, when the bridge 4 goes out of balance due to increase of resistance of 3 as a result of increase in the outdoor temperature, the input of the magnetic amplifier 35 is energized with a polarity such that 32R is negative. In other words increase in outdoor temperature tends to cause the motor to rotate in the direction which closes the valve 2 and reduces the amount of heat.

On the other hand, resistor 22 is energized from the rectifier 21 so that the conductor 18L is negative with reference to 19. Thus, when current flows in 22 due to the cycling unit 20 it energizes the input of the magnetic amplifier 35 so as to make 32R positive with reference to 32L.

Thus, as the current in 22 fluctuates due to the rotation of the inductors 29, 30, a unidirectional voltage of variable magnitude is set up of a polarity which tends to drive the motor in a direction which opens up the valve 2 and increases the heat.

Thus at times when the output of the bridge 4 preponderates over the output of the cycling unit 20 the heat is off and at times when the output of 20 is greater than the output of 4, the heat will be on.

With the control device 12 set at 100 per cent the maximum amplitude of the sine component of the curve of Fig. 5 should be equal to the voltage derived from the bridge 4 when the latter is unbalanced to the extent which occurs when the outdoor temperature is 70° F. This amplitude I have indicated in Fig. 5 by a broken horizontal line identified by the adjacent legend 70° F.

It will be recalled that the bridge 4 is adjusted to balance at −20° F. Thus the voltage between 18R and 19, at −20° F. is zero. I have accordingly shown, in Fig. 5, a legend −20° F. to the zero level of the voltage set up across the resistor 22.

I have also shown a second horizontal broken line to indicate one half of the voltage corresponding to 70° F. This voltage will be set up between 18R and 19 when the temperature is midway between −20° F. and 70° F.; that is to say, 25° F. Accordingly this line is so identified.

The energization of the input terminals 32L, 32R therefore will at all times be in accordance with the difference between the voltage indicated by the curve in Fig. 5 and the voltage due to the bridge 4. Suppose, for example, the temperature out of doors is −20° there will be no voltage set up by the bridge. Accordingly the voltage applied to the input of 35 will be the voltage across 22 as shown in Fig. 5. It will be noted that at no time does this voltage have a value such as to apply a negative voltage to 32R. Accordingly under these circumstances the motor will open up the valve 2 and the heat will remain on continuously.

Suppose now, for example, the temperature out-of-doors be 25° F. so that the unbalanced voltage arising from 4 is one half of the maximum voltage set up across the resistor 22 by the action of 28 and 280. Since the action of 35 is in accordance with the difference between the bridge and cycling unit outputs, whenever the output of 20 is greater than the voltage due to the bridge 4, 32R will be positive and 32L will be negative. Accordingly the heat will be on. Conversely as the voltage across 22 fluctuates in accordance with the rotation of the rotor system of 20 whenever the voltage across 22 is less than that the bridge unbalance voltage, 32L will be positive and 32R will be negative. Accordingly the heat will be off.

From 90° through 180° to 270° the cycling unit output will be greater than the bridge output. From 270° through zero to 90° the cycling unit output will be less than the bridge output. Accordingly with a temperature of 25° out-of-doors the heat will be on half of the cycle and off for the other half of the cycle.

If the outdoor temperature rises to 70° F., the out-of-balance voltage of the bridge will be greater than that of the cycling unit during the whole of the cycle except during the time that the inductor 29 is in proximity to the pole 27. During this period the effect indicated in Fig. 4 is predominant and the output of 20 is greater than that of bridge 4.

Accordingly heat will be on only for this minimum period and will be off throughout the remainder of the cycle.

I show in Fig. 6 the manner in which the characteristic performance of my invention may be adjusted by changing the position of the links 47, 48, thereby altering the value of the resistors of 45 and 46.

Fig. 6 shows the relation between the "heat on" period and the outdoor temperature. By way of example a ten minute cycle is referred to; that is to say, the inductor system 29, 30 rotates at a speed of six revolutions per hour.

In Fig. 6 the lower of the four characteristic curves show the effect obtained when the −20 setting, as illustrated in Fig. 1 is used. This is the adjustment of 46 at which the bridge 4 is balanced at −20°.

Should my heat control system be installed in a more temperate climatic zone I may set the links at the position marked +10. When this is done additional resistance is added in series with the resistor 7 equal to the difference between the resistance of the thermal element 3 at −20° and the higher resistance which, due to its positive temperature coefficient, the element 3 will have at +10° F.

Accordingly, under this condition the bridge 4 will be in balance at 10° instead of at −20°. In order to secure the proper coordination between the bridge 4 and the cycling unit it is necessary at the same time to reduce the value of the resistor 45 to an appropriate extent. The reason for this is that if the bridge is balanced at +10° instead of −20° it will not be so much out of balance at 70° as under the former condition. It is desired however, that at 70° the output of the bridge 4 should develope an output voltage of the magnitude specified above in reference to Fig. 5. Accordingly, the bridge 4 should receive increased energization across its horizontal diagonal. This is accomplished by cutting out an appropriate portion of the resistor 45. The upper curve in Fig. 6 shows the characteristic which will be obtained under this condition.

In like manner characteristics intermediate between those which obtain with the bridge 4 balanced at −20, and when the bridge is balanced at +10, may be obtained by the additional positions at which the links 47 and 48 may be located, as shown in Fig. 1, marked −10° and 0° respectively. The characteristics corresponding to those settings are shown intermediately in Fig. 6.

Although I have chosen a particular embodiment of my invention for the purpose of explanation, many modifications thereof will be apparent to those skilled in the art to which it pertains. My invention, therefore, is not to be limited except in so far as is necessitated by the prior art and the spirit of the appended claims.

What I claim as new and desire to secure by Letters Patent of the United States is:

I claim:

1. A heat regulating system, comprising: control means for permitting and inhibiting the delivery of heat, a thermal resistance element responsive to temperature of a preselected location, an electrical bridge including said thermal resistance element, means for energizing said bridge across one conjugate arm with direct current, means for deriving from the opposite conjugate arm of said bridge a direct current voltage varying in accordance with said temperature, means for producing a direct current voltage fluctuating continuously between predetermined limits, said means including a variable resistance comprising a magnetic stator having a saliency thereon, a reactance winding associated with said saliency, a rotor profiled so that the air gap between said rotor and said saliency varies when said rotor is rotated, and a motor for imparting rotation to said rotor, and means energized in accordance with the difference betwen said bridge voltage and said fluctuating voltage for causing intermittent operation of said control means in accordance with said temperature.

2. Apparatus for controlling the supply of a fluid heating medium in a conduit, comprising: a valve for admitting and excluding said fluid, electrical means for actuating said valve, a thermal resistance element responsive to the temperature of the outside atmosphere, a first electrical bridge including said thermal resistance element, means for energizing said bridge across one conjugate arm, means for deriving from the opposite conjugate arm of said bridge a voltage varying in accordance with said temperature, a first impedance of fixed value, a second impedance of variable value, means for causing the value of said second-mentioned impedance to fluctuate continuously between predetermined limits, including a magnetic stator having a saliency thereon, a reactance winding associated with said saliency, a rotor profiled so that the air gap between said rotor and said saliency varies when said rotor is rotated, and a motor for imparting rotation to said rotor, a second electrical bridge including said impedances, means for energizing said second bridge, means for deriving a fluctuating voltage from said second bridge, and means energized in accordance with the difference between said voltages for actuating said electrical means for causing intermittent operation of said valve in accordance with said temperature.

3. Apparatus for controlling a heating system by varying the relative lengths of the periods of admission and exclusion of a heating fluid, comprising: a valve, means for actuating said valve, a thermal resistance element responsive to temperature of a preselected location, means for deriving a direct current voltage varying in accordance with said temperature, a reactance of variable value, means for causing the value of said reactance to flucutate continuously between predetermined limits, said means including a magnetic stator having a saliency thereon, a reactance winding associated with said saliency, a rotor profiled so that the air gap between said rotor and said saliency varies when said rotor is rotated, and a motor for imparting rotation to said rotor, means for deriving from said variable reactance a direct current voltage fluctuating between zero and a predetermined value, and means energized in accordance with the difference between said direct current voltages for actuating said valve-operating means for causing variable intermittent operation of said valve in accordance with said temperature.

4. Apparatus for controlling a heating system by varying the relative lengths of the periods of delivery and interruption of heat supplied from a source: a valve for controlling said heat supply, means for actuating said valve, a thermal resistance element responsive to temperature of the outside atmosphere, a first electrical bridge including said thermal resistance element, a reactance of variable value, means for causing the value of said reactance to fluctuate continuously between predetermined limits, said means including a magnetic stator having a saliency thereon, a reactance winding associated with said saliency, a rotor profiled so that the air gap between said rotor and said saliency varies when said rotor is rotated, and a motor for imparting rotation to said rotor, a second electrical bridge including said variable reactance, means for energizing said bridges from a source of alternating current, magnetic amplifier means energized in accordance with a relation between electrical effects derived from said bridges for intermittently operating said valve, together with means for varying the relative energization of said bridges so as to exert an additional controlling effect upon the intermittent operation of said valve, jointly adjustable resistances being connected to said bridge to vary their energization.

5. Apparatus for controlling a heating system by varying the relative lengths of the periods of delivery and interruption of heat supplied from a source: a valve for controlling said heat supply, means for actuating said valve, a thermal resistance element responsive to temperature of the outside atmosphere, a first electrical bridge including said thermal resistance element, a reactance of variable value, means for causing the value of said reactance to fluctuate continuously between predetermined limits, said means including a magnetic stator having a saliency thereon, a reactance winding associated with said saliency, a rotor profiled so that the air gap between said rotor and said saliency varies when said rotor is rotated and a motor for imparting rotation to said rotor, a second electrical bridge including said variable reactance, means for energizing said bridges from a source of alternating current, magnetic amplifier means energized in accordance with a relation between electrical effects derived from said bridges for intermittently operating said valve, together with means for varying the relative energizations of said bridges so as to exert an additional controlling effect upon the intermittent operation of said valve, said means comprising a pair of variable impedance devices, means for actuating said devices in opposite senses, means connecting said devices in series across said source, means for energizing said first-mentioned bridge in accordance with the voltage across one of said devices, means for energizing said second-mentioned bridge in accordance with the voltage drop across the other of said devices, whereby the relative energizations of said bridges is varied in accordance with the position of said actuating means.

6. Apparatus for controlling a heating system by varying the relative lengths of the periods of delivery and interruption of heat supplied from a source: a valve for controlling said heat supply, means for actuating said valve, a thermal resistance element responsive to the temperature of the outside atmosphere, a first electrical bridge including said thermal resistance element, a reactance of variable value, motor-operated means for causing the value of said reactance to fluctuate continuously between predetermined limits, a second bridge including said variable reactance, means for energizing said bridges from a source of alternating current, magnetic amplifier means energized in accordance with a relation between electrical effects derived from said bridges for intermittently operating said valve, together with means for adjusting the temperature range of the operation of the system, comprising an adjustable resistance connected in an arm of one of said bridges, a second adjustable resistance connected to vary the energization of one of said bridges, and means for jointly adjusting both of said adjustable resistances.

7. Apparatus for controlling the supply of a fluid heating medium in a conduit, comprising: a valve for admitting and excluding said fluid, electrical means for actuating said valve, a thermal resistance element responsive to the temperature of the outside atmosphere, a first electrical bridge including said thermal resistance element, means for energizing said bridge across one conjugate arm with direct current, means for deriving from the opposite conjugate arm of said bridge a direct current voltage varying in accordance with said termperature, a first reactance of fixed value, a second reactance of variable value, means for causing the value of said second-mentioned reactance to fluctuate continuously between predetermined limits, a second electrical bridge including said reactances, means for energizing said second-mentioned bridge with alternating current, means for deriving a fluctuating direct current voltage from said second bridge, and magnetic amplifier means energized in accordance with the difference between said direct current voltages for actuating said electrical means for causing intermittent operation of said valve in accordance with temperature, said variable reactance comprising a magnetic stator having a saliency thereon, a reactance winding associated with said saliency, a rotor profiled so that the air gap between said rotor and said saliency varies when said rotor is rotated, and a motor for imparting rotation to said rotor.

8. A heat regulating system, comprising: control means for permitting and inhibiting the delivery of heat, electrical means for actuating said control means, a thermal resistance element responsive to a temperature of a preselected location, an electrical bridge including said thermal resistance element, means for energizing said bridge across one conjugate arm with direct current, means for deriving from the opposite conjugate arm of said bridge a direct current voltage varying in accordance with said temperature, means for producing a direct current voltage continuously fluctuating between predetermined limits, and magnetic amplifier means energized in accordance with the difference between said bridge voltage and said fluctuating voltage for activating said electrical means for causing intermittent operation of said control means in accordance with said temperature, the means for producing the fluctuating direct current voltage comprising a first reactor of fixed value, a second reactor of variable value, a third reactor of fixed value and a fourth reactor of variable value, means for deriving from said first and second reactors an alternating current voltage varying in accordance with a preselected relation between the values of said first and second reactors, means for deriving from said third and fourth reactors an alternating current voltage in accordance with a preselected relation between the values of said third and fourth reactors, means for causing the value of said second reactor to fluctuate in a preselected manner, means for causing the value of said fourth reactor to fluctuate in a predetermined different manner than said second reactor, a rectifier, and means for energizing said rectifier in accordance with the resultant of said derived voltages.

9. A heat regulating system, comprising: control means for permitting and inhibiting the delivery of heat, electrical means for actuating said control means, a thermal resistance element responsive to a temperature of a preselected location, an electrical bridge including said thermal resistance element, means for energizing said bridge across one conjugate arm with direct current, means for deriving from the opposite conjugate arm of said bridge a direct current voltage varying in accordance with said temperature, means for producing a direct current voltage continuously fluctuating between predetermined limits, and magnetic amplifier means energized in accordance with the difference between said bridge voltage and said fluctuating voltage for activating said electrical means for causing intermittent operation of said control means in accordance with said temperature, the means for producing the fluctuating direct current voltage comprising a first reactor of fixed value, a second reactor of variable value, a third reactor of fixed value and a fourth reactor of variable value, means for deriving an alternating current voltage varying in accordance with a pre-selected relation between the values of said first and said second reactors, means for deriving an alternating current voltage varying in accordance with a preselected relation between said third and said fourth reactors, means for causing the value of said second reactor periodically to fluctuate in a preselected manner with time, means for causing the value of said fourth reactor periodically to fluctuate in a different manner with time than said second reactor, a rectifier, and means for energizing said rectifier in accordance with the resultant of said derived voltages, said second and fourth reactors comprising magnetic stators having saliencies thereon, a reactance winding associated with each said saliency, said first and third reactors comprising rotors profiled so that the air gap between said rotors and said saliencies, respectively, varies when said rotor is rotated, both of said rotors being mounted upon a common shaft, a motor for imparting rotation to said rotors, the profile of one of said rotors being shaped so that the air gap varies during a complete revolution, and the profile of another of said rotors being shaped so that the air gap remains constant during a portion of a revolution and variable during the remainder of said revolution.

ALAN S. FITZ GERALD.

REFERENCES CITED

The following references are of record in the file of this patent:

UNITED STATES PATENTS

| Number | Name | Date |
| --- | --- | --- |
| 2,050,446 | Meyer | Aug. 11, 1936 |
| 2,220,028 | Smith | Oct. 29, 1940 |
| 2,272,492 | Weyher | Feb. 10, 1942 |
| 2,344,991 | Lilja | Mar. 28, 1944 |
| 2,421,420 | Hathaway | June 3, 1947 |

FOREIGN PATENTS

| Number | Country | Date |
| --- | --- | --- |
| 777,297 | France | Nov. 26, 1934 |

OTHER REFERENCES

A. P. C. application of Kool et al., Serial No. 421,940, published May 25, 1943.